(12) United States Patent
Miyazaki et al.

(10) Patent No.: US 11,037,037 B2
(45) Date of Patent: Jun. 15, 2021

(54) IMAGE PROCESSING APPARATUS, IMAGE PROCESSING METHOD, AND NON-TRANSITORY COMPUTER READABLE STORAGE MEDIUM

(71) Applicant: CANON KABUSHIKI KAISHA, Tokyo (JP)

(72) Inventors: Shinichi Miyazaki, Kawasaki (JP); Shuhei Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/453,048

(22) Filed: Jun. 26, 2019

(65) Prior Publication Data

US 2020/0012908 A1 Jan. 9, 2020

(30) Foreign Application Priority Data

Jul. 5, 2018 (JP) .............................. JP2018-128568

(51) Int. Cl.
*G06K 15/02* (2006.01)
*G06T 7/593* (2017.01)
(Continued)

(52) U.S. Cl.
CPC ....... *G06K 15/1872* (2013.01); *G06K 15/102* (2013.01); *G06T 5/003* (2013.01);
(Continued)

(58) Field of Classification Search
CPC .. G06K 15/1872; G06K 15/102; G06T 7/593; G06T 5/003; G06T 5/008;
(Continued)

(56) References Cited

U.S. PATENT DOCUMENTS 9,324,153 B2 4/2016 Komatsu
9,406,139 B2 8/2016 Shionozaki et al.
(Continued)

FOREIGN PATENT DOCUMENTS

JP 2008-015754 A 1/2008
JP 2013-118468 A 6/2013
(Continued)

OTHER PUBLICATIONS

Radhakrishna Achanta, et al., "SLCI Superpixels Compared to State-of-the-Art Superpixel Methods," IEEE Transactions on Pattern Analysis and Machine Intelligence, vol. 34, No. 11 (Nov. 2012), pp. 2274-2281.

(Continued)

*Primary Examiner* — Quang N Vo
(74) *Attorney, Agent, or Firm* — Venable LLP

(57) ABSTRACT

According to an embodiment of this invention, an image processing apparatus for acquiring image data edited after obtained by image-capturing an object performs the following processing. More specifically, the apparatus obtains information, equivalent to a distance from a focal plane in image-capturing, corresponding to image data before editing, obtained when image-capturing the object, and generates information, equivalent to a distance from a focal plane, corresponding to the edited image data, based on the edited image data, and the information, equivalent to the distance from the focal plane, corresponding to the image data before editing.

22 Claims, 11 Drawing Sheets

(51) Int. Cl.
  *H04N 13/122* (2018.01)
  *G06T 5/00* (2006.01)
  *G06K 15/10* (2006.01)
(52) U.S. Cl.
  CPC .............. *G06T 5/008* (2013.01); *G06T 7/593* (2017.01); *H04N 13/122* (2018.05); *G06T 2207/20021* (2013.01); *G06T 2207/20208* (2013.01)
(58) Field of Classification Search
  CPC    G06T 2207/20021; G06T 2207/20208; H04N 13/122
  USPC ................................ 358/3.27, 1.15, 1.9, 3.26
  See application file for complete search history.

(56) References Cited

U.S. PATENT DOCUMENTS

| | | |
|---|---|---|
| 9,426,444 B2 | 8/2016 | Guigues et al. |
| 9,477,315 B2 | 10/2016 | Fujimura et al. |
| 2006/0098861 A1* | 5/2006 | See ............ G06T 7/32 382/145 |
| 2013/0142452 A1 | 6/2013 | Shionozaki et al. |
| 2013/0300860 A1 | 11/2013 | Komatsu |
| 2014/0253679 A1 | 9/2014 | Guigues et al. |
| 2014/0282259 A1 | 9/2014 | Fujimura et al. |
| 2015/0296122 A1* | 10/2015 | Kelley ............ G06T 5/00 348/349 |
| 2016/0065924 A1* | 3/2016 | Yokoyama .......... G06T 5/003 348/241 |
| 2016/0307361 A1 | 10/2016 | Shionozaki et al. |
| 2017/0272704 A1* | 9/2017 | Kato ............. G06T 5/003 |
| 2019/0253609 A1 | 8/2019 | Miyazaki et al. |
| 2019/0253689 A1 | 8/2019 | Yanai et al. |
| 2019/0253690 A1 | 8/2019 | Yanai et al. |

FOREIGN PATENT DOCUMENTS

| | | |
|---|---|---|
| JP | 2013-253964 A | 12/2013 |
| JP | 2014-179097 A | 9/2014 |
| JP | 2015-162730 A | 9/2015 |
| JP | 6143747 B2 | 6/2017 |
| JP | 2017-157208 A | 9/2017 |
| WO | 2012/175731 A1 | 12/2012 |

OTHER PUBLICATIONS

Dongbo Min, et al., "Fast Global Image Smoothing Based on Weighted Least Squares," IEEE Transaction on Image Processing, vol. 23, Issue 12 (2014), pp. 5638-5653.

Johannes Kopf, et al., "Joint Bilateral Upsampling," ACM Transactions on Graphics, vol. 26, No. 3, Article No. 96 (Jul. 2007).

* cited by examiner

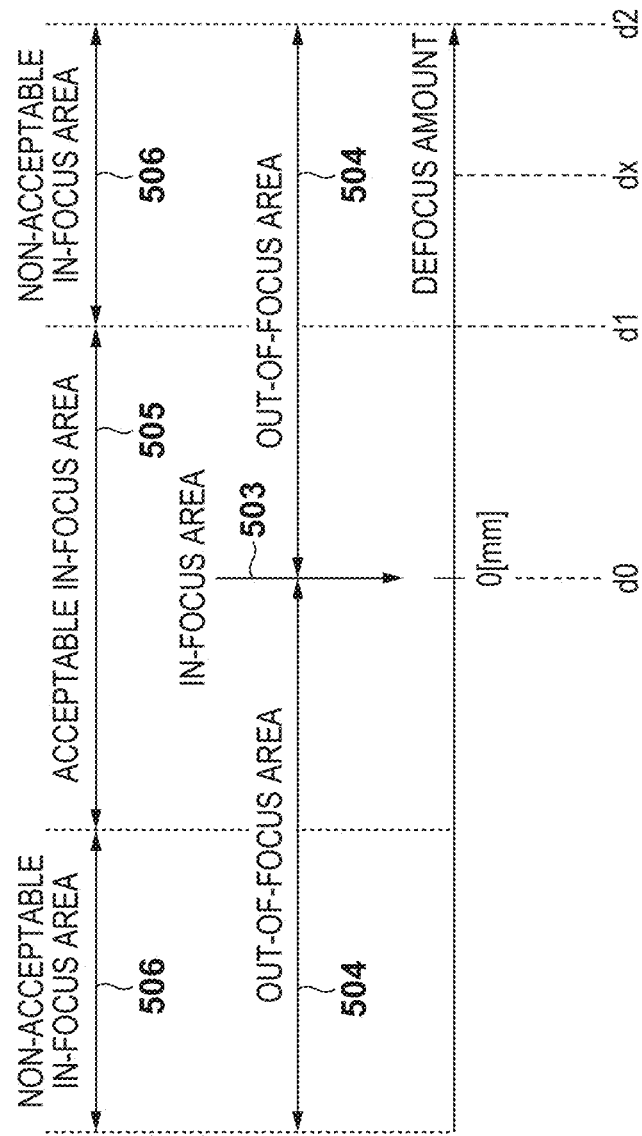

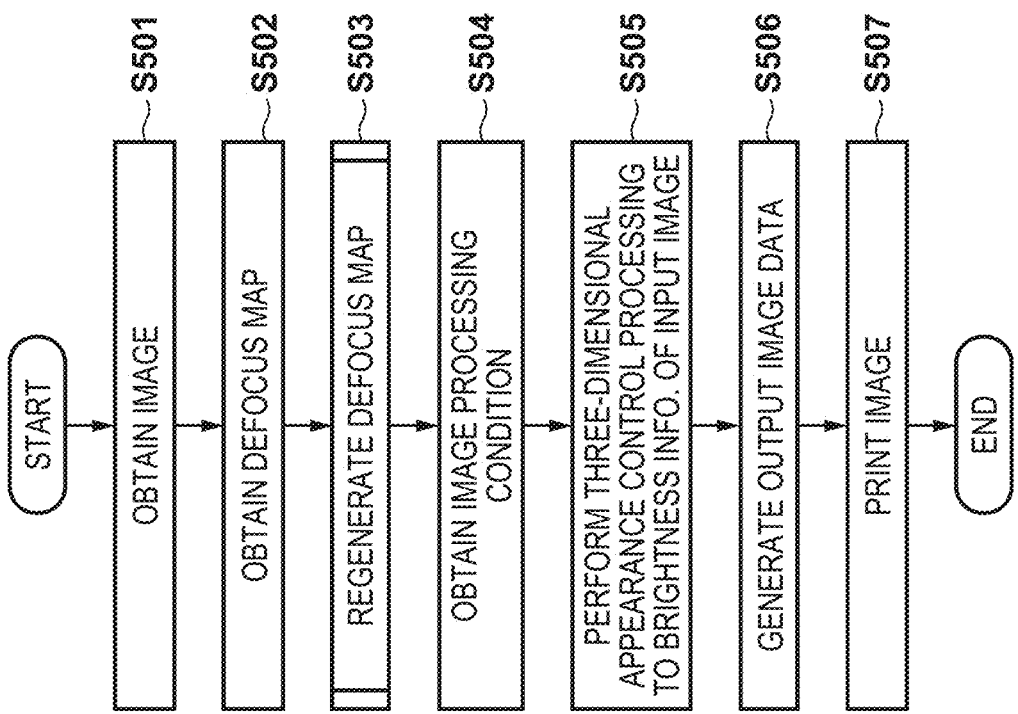
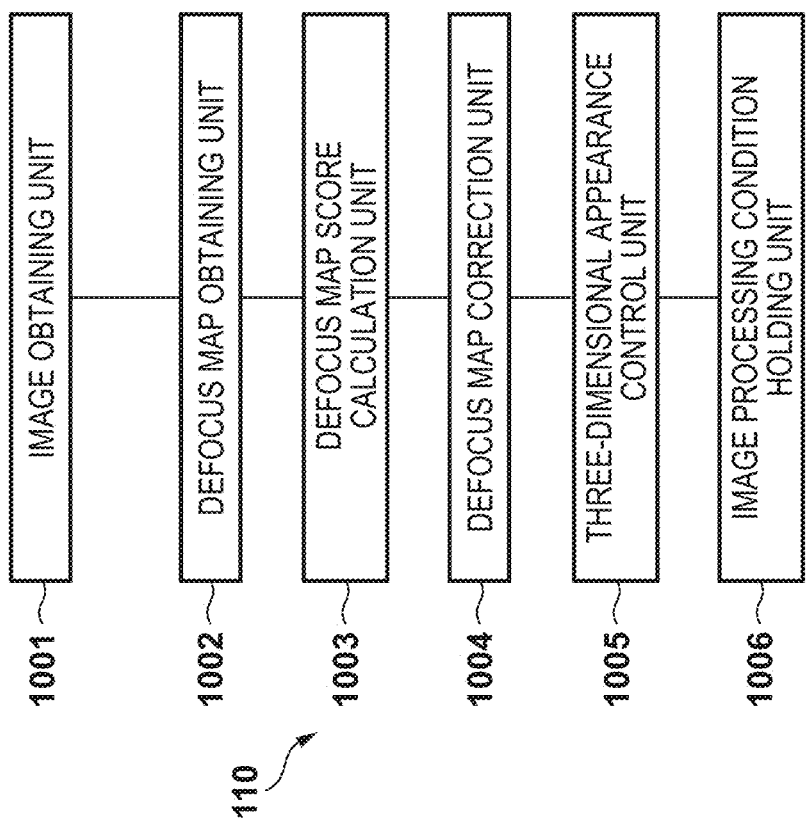

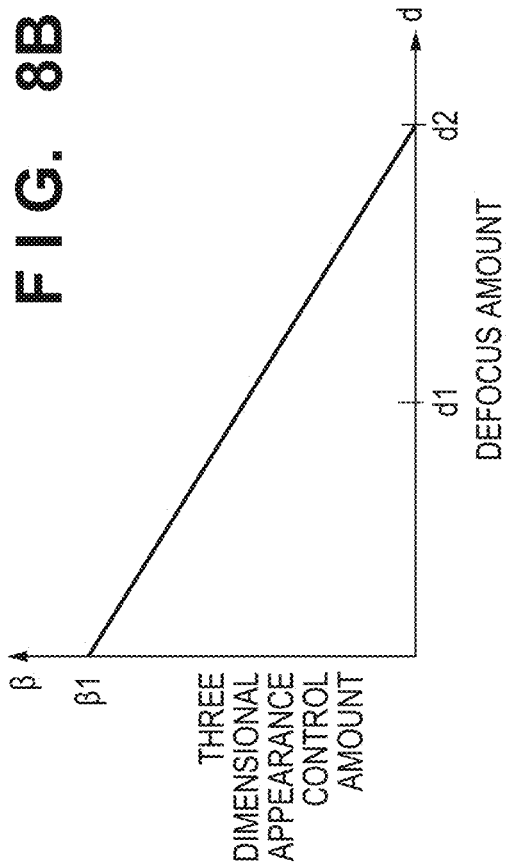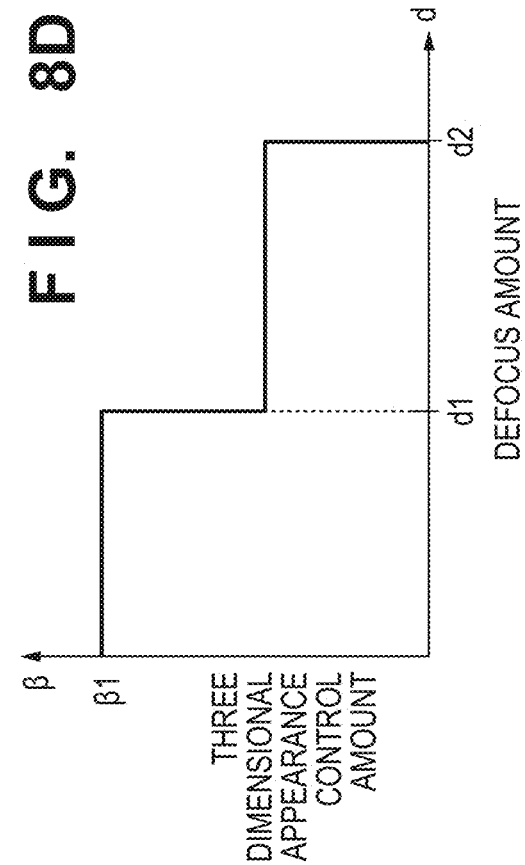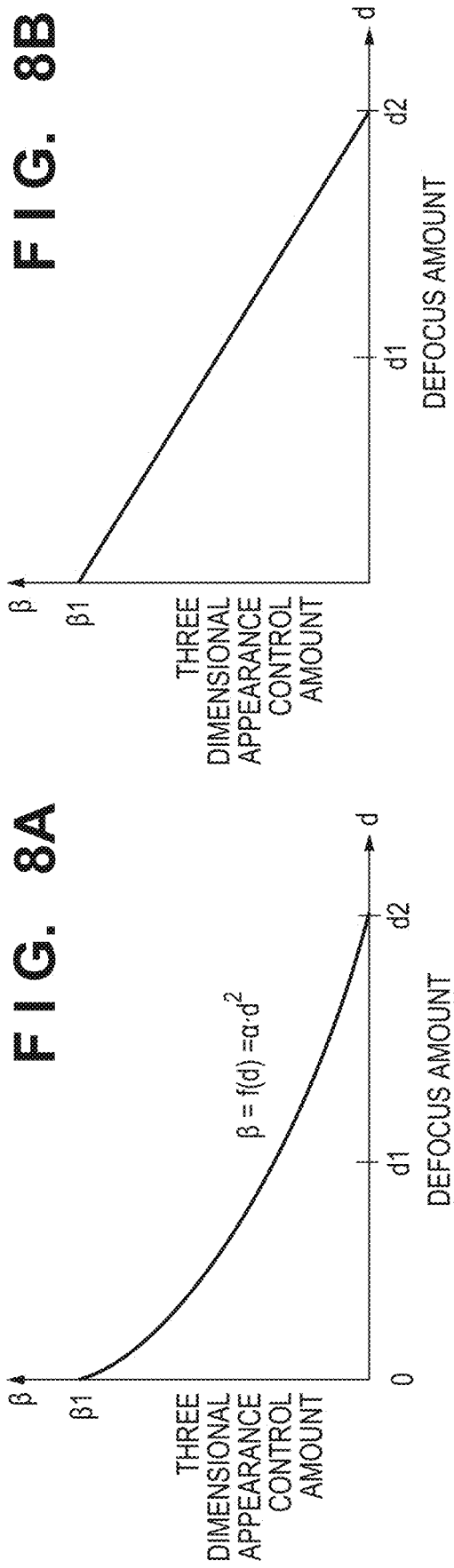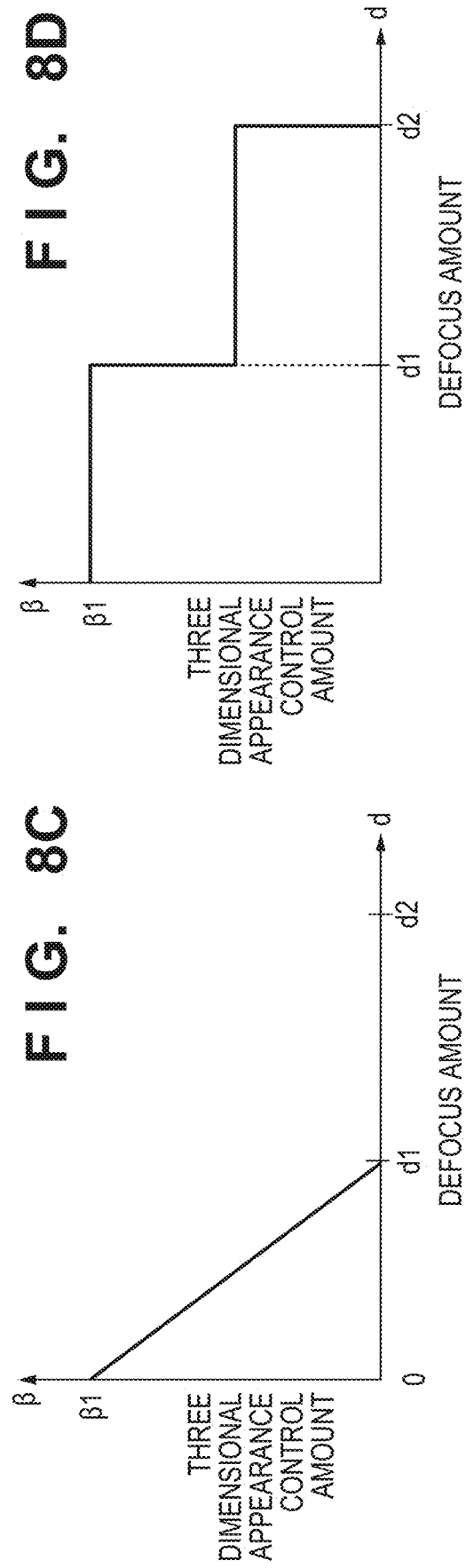

IMAGE PROCESSING APPARATUS, IMAGE PROCESSING METHOD, AND NON-TRANSITORY COMPUTER READABLE STORAGE MEDIUM

BACKGROUND OF THE INVENTION

Field of the Invention

The present invention relates to an image processing apparatus, an image processing method, and a non-transitory computer readable storage medium, and particularly to an image processing apparatus, an image processing method, and a storage medium for effectively controlling, for example, the three-dimensional appearance of an image output to a printer.

Description of the Related Art

A human three-dimensionally perceives a thing looked at with his/her eyes and is considered to perceive it by his/her brain based on clues from both eyes, clues from a single eye, motion parallax, and the like. The clues from both eyes include retinal parallax that is a difference between retinal images on both eyes. The clues from a single eye include line perspective, the dimensions of an object, the gradient of a texture, shading, perspective, and the effect of blurring. By using one or more of these clues, the human perceives a three-dimensional appearance, that is, the depth, thickness, and height of a "thing" and the anteroposterior relationship of the "thing".

When looking at a two-dimensional image captured by a camera or the like and displayed, projected, or printed, the human perceives the three-dimensional appearance of the image from a difference in blurring between an in-focus portion and a portion that is out of focus depending on the depth. That is, the reproduction of the focused (in-focus) portion and defocused (out-of-focus) portion of the image is important for the three-dimensional appearance.

Japanese Patent No. 6143747 proposes a method of improving the quality of a depth map obtained from a camera by detecting a defect pixel that may take at least either the form of a noise-including pixel value and the form of an interpolated "flying pixel". Various image processes utilize information (depth value and defocus amount) equivalent to a distance from the focal plane, which is obtained from parallax information of an image-capturing apparatus or parallax information of two image-capturing apparatuses.

Information equivalent to a distance from the focal plane such as parallax information obtained from an image-capturing apparatus, parallax information obtained from two image-capturing apparatuses, or a depth map in which the quality of the parallax information is improved by the method disclosed in Japanese Patent No. 6143747 is information that is in one-to-one correspondence with captured image data. Thus, in a case where the image data is edited, the correspondence between the edited image data and information equivalent to a distance from the focal plane is lost.

As a result, no intended processing effect is obtained by image processing that uses information equivalent to a distance from the focal plane. For example, when printing an image by a printing apparatus (printer) using edited image data, deterioration correction on the printing apparatus side cannot be properly performed and an image of a three-dimensional appearance cannot be obtained.

SUMMARY OF THE INVENTION

Accordingly, the present invention is conceived as a response to the above-described disadvantages of the conventional art.

For example, an image processing apparatus, an image processing method, and a non-transitory computer readable storage medium according to this invention are capable of performing processing so that the three-dimensional appearance of an image felt by a human can be properly represented even in an edited image that has undergone image processing on a captured image.

According to one aspect of the present invention, there is provided an image processing apparatus comprising: an acquiring unit configured to acquire image data edited after obtained by image-capturing an object; an obtaining unit configured to obtain information, equivalent to a distance from a focal plane in image-capturing, corresponding to image data before editing, obtained when image-capturing the object; and a generation unit configured to generate information, equivalent to a distance from a focal plane, corresponding to the edited image data, based on the edited image data, and the information, equivalent to the distance from the focal plane, corresponding to the image data before editing.

According to another aspect of the present invention, there is provided a non-transitory computer readable storage medium storing a program for causing a computer to function as each unit of the image processing apparatus having the above arrangement.

According to still another aspect of the present invention, there is provided an image processing method comprising: acquiring image data edited after obtained by image-capturing an object; obtaining information, equivalent to a distance from a focal plane in image-capturing, corresponding to image data before editing, obtained when image-capturing the object; and generating information, equivalent to a distance from a focal plane, corresponding to the edited image data, based on the edited image data, and the obtained information, equivalent to the distance from the focal plane, corresponding to the image data before editing.

The invention is particularly advantageous since it is possible to perform processing so that the three-dimensional appearance of an image felt by a human can be properly represented even in an edited image that has undergone image processing on a captured image.

Further features of the present invention will become apparent from the following description of exemplary embodiments (with reference to the attached drawings).

BRIEF DESCRIPTION OF THE DRAWINGS

FIG. 4 is a view exemplifying a defocus map;

FIGS. 5A and 5B are a block diagram showing the arrangement of an image processing unit and a general flow chart of image processing on the image processing unit;

FIGS. 8A, 8B, 8C, and 8D are graphs showing the relationship between the defocus amount and the three-dimensional appearance control amount;

DESCRIPTION OF THE EMBODIMENTS

Figure 1:
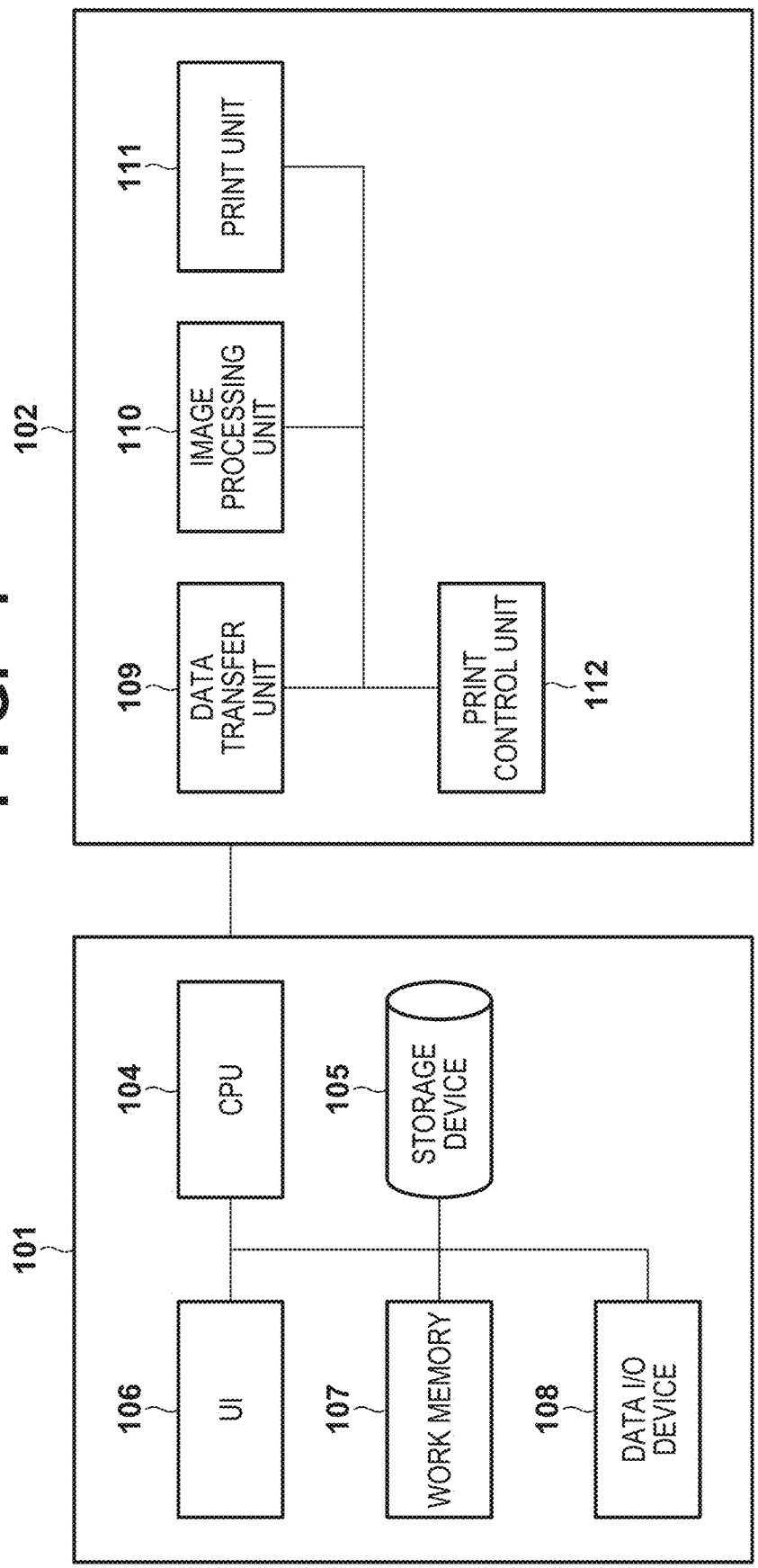
FIG. 1 is a block diagram showing the schematic arrangement of an image processing system according to an exemplary embodiment of the present invention.

Exemplary embodiments of the present invention will now be described in detail in accordance with the accompanying drawings. Note that portions that have already been described will be given the same reference numerals and redundant description will be omitted. Further note that all constituent elements described in the following embodiments are merely illustrative, and they are not intended to limit the scope of invention to such disclosures.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Note that in the following description, although an inkjet printer will be described as an example of an output apparatus that outputs an image, a laser beam printer adopting an electrophotographic method, or a sublimation-type printer which heats ink applied on an ink ribbon, and evaporates it for printing may be used.

<General Description of Image Processing System (FIGS. 1 to 4)>

FIG. 1 is a block diagram showing the overall arrangement of an image processing system (to be referred to as a system hereinafter) using an image processing apparatus according to an exemplary embodiment of the present invention. As shown in FIG. 1, the system is constituted by a personal computer apparatus (PC) 101 (to be referred to as a PC hereinafter) and an output apparatus 102. The PC 101 and the output apparatus 102 are connected by a wired/wireless network or an interface such as USB or local bus.

The PC 101 performs, for example, transfer of a print control instruction, necessary information, and image data to the output apparatus 102. A storage device 105 stores an OS, system programs, various applications, and parameter data necessary for various processes. The storage device 105 is constituted by a hard disk (HD), a solid state disk (SSD), and a rewritable storage medium such as a flash ROM. A CPU 104 performs processing using a work memory 107 such as a RAM when performing software stored in the storage device 105. In regard to performing the processing, an operation unit (to be referred to as a UI hereinafter) 106 serving as a user interface includes input devices such as a keyboard and a pointing device, and a display device such as a display in order to perform processing regarding input from the user and display to the user. A data I/O device 108 performs data input/output from/to an external storage medium such as an SD card. An image capturing apparatus (not shown) such as a digital camera may be directly connected to the data I/O device 108 or a data transfer unit 109 to transfer data without mediating an external storage medium.

The output apparatus 102 is constituted by the data transfer unit 109, a print control unit 112, an image processing unit 110, and a print unit 111. The PC 101 transmits print data to the output apparatus 102.

The print data includes:
(1) image data of photographic data obtained by image-capturing an object by the image capturing apparatus;
(2) the image data and information equivalent to a distance from the focal plane at the time of shooting corresponding to the image data;
(3) image processing parameters serving as data unique to a print medium and print control data; and
(4) print information data such as a print quality and print medium selected on the UI.

The information (to be described later) equivalent to a distance from the focal plane at the time of shooting includes a defocus amount, an image shift amount, and a distance from an actual focal plane to an object.

Although data generated by the image capturing apparatus such as a digital camera will be explained here, data is not limited to this and may be data generated from information obtained by actually measuring a distance. The data may be, for example, both data generated from the result of analyzing the blurring amount of input image data and another data at the time of shooting. The input image data and the information equivalent to a distance from the focal plane may be generated in the image capturing apparatus or generated in the PC 101 or output apparatus 102 connected to the image capturing apparatus.

Information for generating information equivalent to a distance from the focal plane may be obtained from the image capturing apparatus to generate information equivalent to a distance from the focal plane in the PC 101 or output apparatus 102 connected to the image capturing apparatus. It is also possible to connect the image capturing apparatus to the PC 101, and generate information in the output apparatus 102 that obtains via the PC 101 information for generating information equivalent to a distance from the focal plane. The information for generating information equivalent to a distance from the focal plane is, for example, a pair of images obtained by photoelectrically converting beams having passed through different regions of the exit pupil of an imaging lens.

The data transfer unit 109 extracts, from print data transmitted from the PC 101, input image data, data equivalent to a distance from the focal plane at the time of shooting, and image processing parameters, transfers them to the image processing unit 110, and transfers print control data to the print control unit 112. The input image data is data resized to the size of a user-set print medium by resolution conversion processing stored as a program in the storage device 105 within the PC 101. The resolution conversion processing may be performed similarly in the image processing unit 110 within the output apparatus 102. The image processing unit 110 is incorporated in the output apparatus 102 in this system, but may be incorporated in the PC 101.

The image processing parameters and the print control data are stored in a storage device (not shown) such as the storage device 105 in the PC 101 or the hard disk, ROM, or the like in the output apparatus 102. However, the image processing parameters and the print control data may be selected based on print information data in print data and transferred to the image processing unit 110 and the print control unit 112. The print control unit 112 controls the operation of the print unit 111 in accordance with the print control data. The print unit 111 is configured to print by discharging ink from a printhead complying with an inkjet method and forming an image on a print medium.

Figure 2:
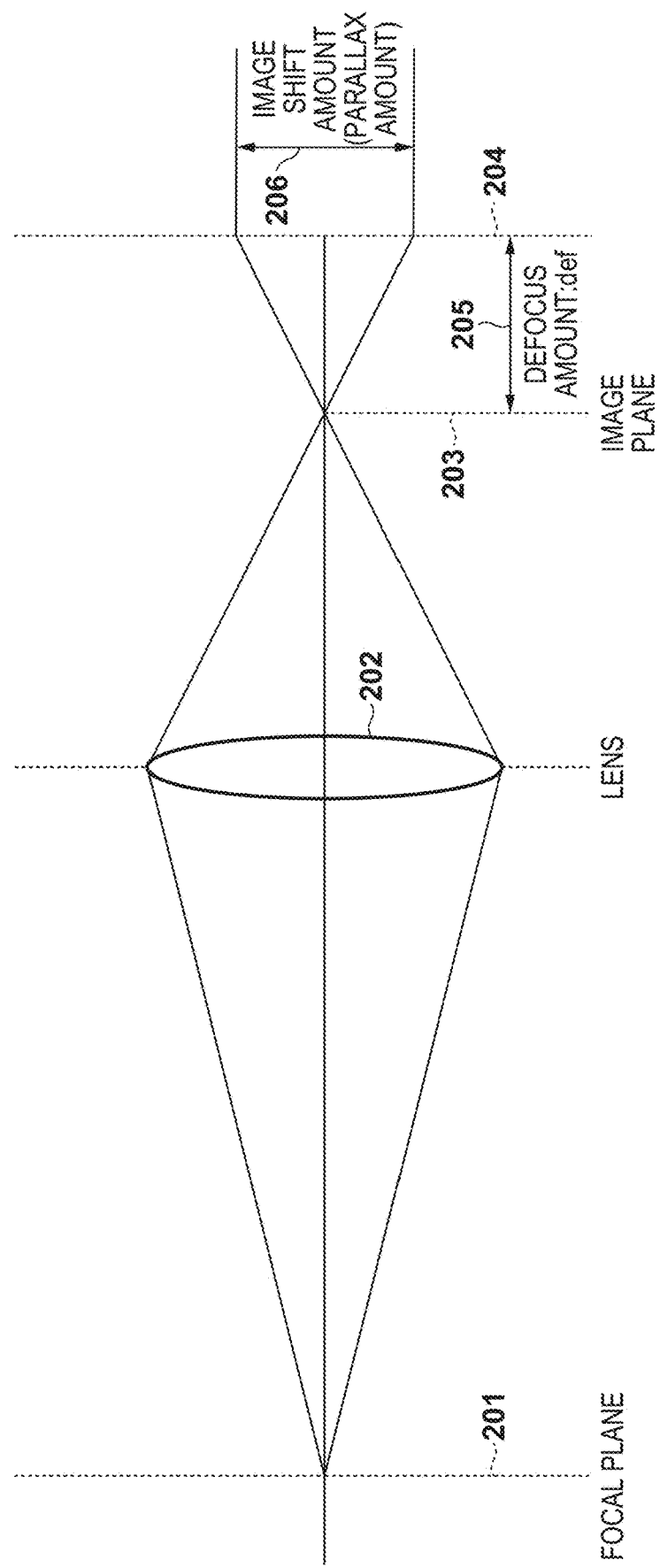
FIG. 2 is a view showing the relationship between the focal plane, the image shift amount, and the defocus amount.

FIG. 2 is a view for explaining the relationship between the focal plane, the image shift amount, and the defocus amount at the time of shooting an object.

In FIG. 2, a focal plane 201 is an in-focus plane parallel to an image plane (image sensing plane) 203 in the image capturing apparatus. A defocus amount 205 is a difference between the image plane 203 and a defocused image sensing plane position 204 (a difference between a prospective imaging plane and an actual imaging plane), and is proportional to a blurring amount. As for the defocus amount 205, there are conventionally known a pupil division type phase difference detection method and an image capturing apparatus configured to detect a defocus amount using differently blurring images.

For example, Japanese Patent Laid-Open No. 2008-15754 has disclosed a method of calculating the defocus amount 205 from an image shift amount (a parallax amount) 206 of an image shown in FIG. 2. A correlation value is calculated while relatively shifting data with respect to a pair of pixel data obtained by photoelectric conversion of beams having passed through different regions of the exit pupil of an imaging lens. The image shift amount 206 having the highest correlation serves as a parallax amount.

Further, the defocus amount 205 from the prospective imaging plane of an object image plane is calculated with respect to the calculated image shift amount 206 using a conversion factor determined in accordance with the pixel pitch of an image sensor and a lens. Japanese Patent Laid-Open No. 2013-253964 has disclosed a method of calculating a defocus amount by the Depth From Defocus (DFD) method. In the DFD method, differently blurring images are obtained by controlling the photographing parameters of an image sensing optical system, a measurement target pixel and its neighboring pixel in a plurality of obtained images are used to calculate a correlation amount between their blurs, and a defocus amount is calculated.

Next, a method of calculating a distance between a focal plane and an object will be described.

Figure 3:
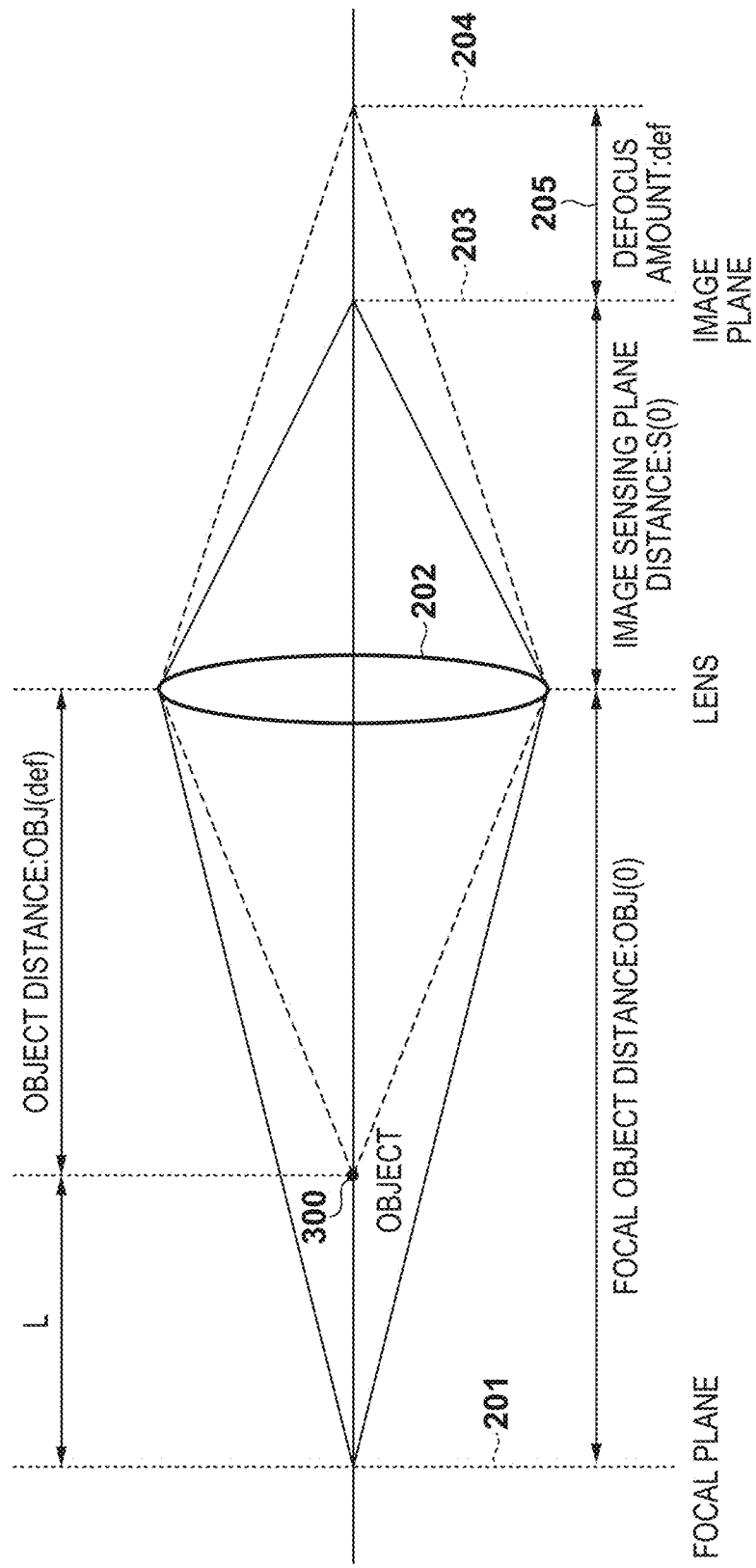
FIG. 3 is a view showing the relationship between the focal object distance, the image sensing plane distance to a focal image object, the object distance, and the distance from the focal plane to the object in an image capturing apparatus.

FIG. 3 is a view showing the relationship between the focal plane, the object, the lens, and the image plane.

In FIG. 3, the formula of a lens is established between a distance OBJ(0) between the lens 202 and the focal plane 201, a distance S(0) between the lens 202 and the image plane 203, a distance OBJ(def) between an object 300 and the lens 202, and a distance L between the focal plane 201 and the object 300. In other words, equations (1) and (2) below are established, so the object distance OBJ(def) can be calculated by equation (3):

$$1/OBJ(0)+1/S(0)=1/f \quad (1)$$

$$1/OBJ(def)+1/\{S(0)+def\}=1/f \quad (2)$$

$$OBJ(def)=\{(S(0)+def)*f\}/\{(S(0)-def)*f\} \quad (3)$$

where OBJ(0) is the focal object distance, S(0) is the image sensing plane distance, and OBJ(def) is the object distance. The distance L from the focal plane 201 to the object 300 can be calculated by subtracting the object distance OBJ(def) calculated by equation (3) from the object distance OBJ(0).

The above-mentioned information equivalent to a distance from the focal plane is information proportional to a distance from the focal plane. The information equivalent to a distance from the focal plane can be any of the image shift amount 206, the defocus amount 205, and the distance L from the focal plane to the object.

Next, a defocus map will be explained.

FIG. 4 is a view for explaining the defocus map.

The defocus map is a map of defocus amounts descried above at a plurality of portions on an input image. Here, the defocus map holds information of defocus amounts corresponding to respective pixels of input image data. FIG. 4 is a view for explaining the defocus amount and each area used in image processing here.

In FIG. 4, a defocus amount 0 is a defocus amount equivalent to a focal plane at the time of shooting, and an area having a defocus amount 0 corresponds to an area 503, and is an in-focus (focal plane) image area. This area will be called an "in-focus area".

An area other than the in-focus area 503 will be called an out-of-focus area 504 that is an area not corresponding to the focal plane on the defocus map. An area accepted to be in focus will be called an acceptable in-focus area 505. The range of the acceptable in-focus area 505 may be defined by, for example, the depth of field, or the acceptable in-focus area 505 may be defined by an examinee's experiment. An area other than the acceptable in-focus area 505 will be called a non-acceptable in-focus area 506 as an area that is not the acceptable in-focus area 505. In FIG. 4, an abscissa axis indicates a defocus amount. However, the abscissa axis may indicate the above image shift amount 206 that is information equivalent to a distance from the focal plane or information of a distance from the focal plane. Note that in FIG. 4, d0 indicates that a defocus amount is 0 that is "in-focus area", and dx indicates a defocus amount in the non-acceptable in-focus area.

Next, image processing for printing an image with a three-dimensional appearance on a print medium in the image processing system having the above-described arrangement will be described.

<Description of Image Processing (FIGS. 5A to 6)>

FIGS. 5A and 5B are views showing the arrangement of the image processing unit and an outline of its image processing. FIG. 5A is a block diagram showing the detailed arrangement of the image processing unit 110, and FIG. 5B is a flowchart showing an outline of image processing.

Here, defocus information will be exemplified as information equivalent to a distance from the focal plane. A defocus map is calculated by the pupil division phase difference detection method in an image-capturing apparatus such as a digital camera.

In step S501, an image obtaining unit 1001 obtains edited image data from captured image data. The edited image data is image data edited/processed by image editing software or the like, and editing/processing is adjustment of the image quality such as contrast, brightness, or sharpness. The edited image data is assumed to be image data in which the contrast is decreased by executing contrast adjustment.

The contrast in an area where the contrast is high in the area of the focal plane in a corresponding defocus map for image data before editing is decreased in the image data after editing, and the image is in a state shifted from the focal plane (in a more blurring state). In this example, therefore, the defocus information is corrected using the image data after editing.

In step S502, a defocus map obtaining unit 1002 obtains a corresponding defocus map for the image data before editing. A defocus map score calculating unit 1003 obtains the above-mentioned image data after editing obtained by the image obtaining unit 1001.

In step S503, a defocus map is regenerated.

Figure 6:
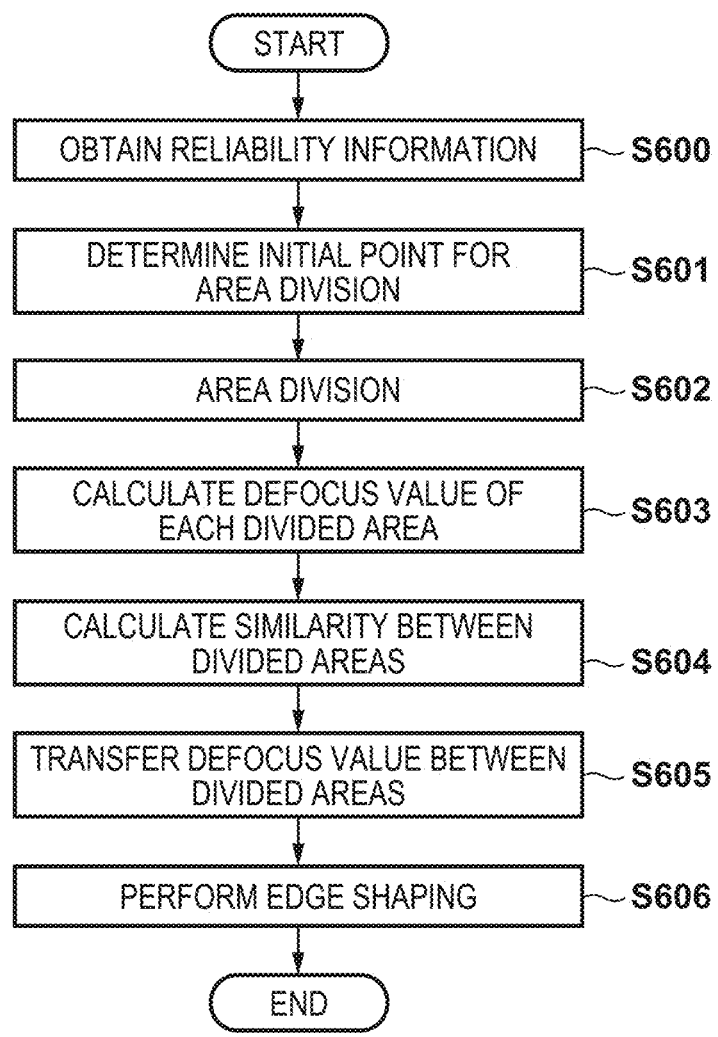
FIG. 6 is a flowchart showing a detail description of defocus map regeneration processing.

FIG. 6 is a flowchart showing details of the defocus map regeneration processing in step S503. The defocus map regeneration will be explained with reference to FIG. 6.

First, in step S600, reliability information is obtained. The reliability information is obtained from the outside, similar to defocus information, and is information representing whether defocus information is obtained accurately. The reliability information may be 1-bit information representing whether defocus information is reliable, that is, may be information of 1→reliable or 0→unreliable. Alternatively, the reliability information may be obtained as, for example, a combination of 8-bit reliable degree information expressible at 256 levels, and the threshold of reliability information. When reliable degree information and a threshold are obtained, it is determined that, for example, a value larger than the threshold represents a pixel reliable as defocus information. When no reliability information is obtained, it may be determined that information of all pixels of the defocus map is reliable.

Then, in step S601, the positions of initial points for area division are set to divide the defocus map into areas. The positions of initial points may be set on the map uniformly or at random. Further, in step S602, area division is performed based on the area division initial points obtained in step S601.

An example of the area division method is a method described in the reference: Achanta, et al., IEEE Transactions on Pattern Analysis and Machine Intelligence 2012, "SLIC Superpixels Compared to State of the Art Superpixel Methods". The map may be simply divided into rectangular shapes. In this embodiment, the area division method is not particularly limited and area division is performed based on a known technique.

In step S603, the representative defocus amount of an area is calculated for each area. The median of defocus amounts in the area is adopted as the representative defocus amount of the area. However, when the variance of defocus amounts in the area exceeds a predetermined threshold, or when it is determined from reliability information that the pixel is unreliable, the defocus amount of each area is regarded as an indefinite value (error).

In step S604, the similarity between areas is calculated. The similarity between areas can be calculated by histogram intersection between adjacent areas according to equation (4):

$$\text{Similarity}(l, m) = \frac{\sum_{i=0}^{NB-1} \min\{hist_l(i), hist_m(i)\}}{\sum_{i=0}^{NB-1} hist_l(i)} \quad \text{if } def_m \neq \text{error}$$
$$= 0 \quad \text{else} \qquad (4)$$

where l and m are indices of respective areas in which the areas m and l are adjacent to each other, $hist_l$ is the histogram of the area l, $hist_m$ is the histogram of the area m, and NB is the number of bins of the histogram. The histogram is created in advance from processed image data and an area division result. The similarity with an area where the defocus amount is error is 0.

In step S605, a defocus amount calculated for each area is propagated based on the inter-area similarity (equation (5)):

$$def_l = \sum_{m=0}^{NS-1} \text{Similarity}(l, m) \cdot def_m \bigg/ \sum_{m=0}^{NS-1} \text{Similarity}(l, m) \qquad (5)$$

Although the similarity is calculated between adjacent areas, areas may not always be adjacent to each other and the similarity may be calculated based on the distance between areas or a value corresponding to color. A defocus amount for the same area may be propagated not once but repetitively a plurality of times. By repeating the propagation a plurality of times, a defocus amount of each area that is determined to be an error in step S603 can be estimated more easily.

Finally, in step S606, edge shaping is performed. Edge shaping is processing of making an edge in the defocus map obtained in step S605 coincide with an edge of an input image. This is because the edge of an image in edited image data is sometimes lost as a result of, for example, great image adjustment.

For example, edge shaping is performed using, for example, an edge-preserving filter described in the references: Min et al., IEEE Transactions on Image Processing, vol. 23, issue 12, pp. 5638-5653, 2014 "Fast Global Smoothing Based on Weighted Least Squares" and Kopf et al., ACM Transactions on Graphics, "Joint Bilateral Upsampling". Since edge shaping itself is a known technique, a description thereof will be omitted. The method of performing edge shaping is not limited to the above-described one as long as an edge in the defocus map is made to coincide with an edge of an input image.

In area division processing, when image data after processing is adjusted in a direction in which the contrast is decreased by contrast adjustment, the contrast of an edge in the image also decreases. For this reason, the area division count of image data after processing may become smaller than the area division count of image data before processing (image data corresponding to an input defocus map). When the contrast of the image decreases, the area per area increases and the defocus amount of the area is adjusted in a direction in which the defocus amount deviates from an in-focus point as a result of taking a median between a defocus amount in the in-focus state and a defocus amount in the out-of-focus state.

Edge shaping is performed after the defocus amount of each area is propagated based on the calculated inter-area similarity. Therefore, the position of an edge in the regenerated defocus map can be made to coincide with the position of an edge in edited image data. Defocus information in which the correspondence with the edited image data is recovered can be generated.

After defocus map regeneration is executed in step S503 by the above-described processing, processes in steps S504 to S507 are executed in FIG. 5B.

In step S504, an image processing condition is obtained. In step S505, three-dimensional appearance control processing set in the image processing condition is executed on brightness information of each pixel of input image data while referring to the defocus amount of the defocus map of a pixel to be processed. Details of these processes will be described later.

In step S506, the print control unit 112 generates data used to print an image by discharging ink from an inkjet printhead in accordance with image data (RGB) output from a three-dimensional appearance control unit 1005. The generation processing includes color conversion processing of converting device-independent RGB data into device-dependent RGB data, ink color decomposition processing of converting device-dependent RGB data into ink color data, and tone correction processing of performing tone correction so that the tone linearly corresponds to the gradation characteristic of a printing apparatus. Further, half-toning processing of converting ink color data into ink dot ON/OFF information, mask data conversion processing of generating binary data to be printed by each print scanning of the printhead, and the like are executed. All these processes are general processes in an inkjet printer and do not concern the essence of this embodiment, so a detailed description thereof will be omitted.

Finally, in step S507, the output image data generated by the print control unit 112 is transferred to the print unit 111, and the print unit 111 prints an image on a print medium based on the output image data.

<Three-Dimensional Appearance in Output Apparatus>

The output characteristic of the output apparatus 102 that influences the sharpness, and control of the three-dimensional appearance will now be described.

When looking at a two-dimensional image shot by a camera or the like, a human feels the sense of depth and three-dimensional appearance of an image from the difference between the sharpness of an acceptable in-focus area including a focused (in-focus) area and that of a defocused (out-of-focus) non-acceptable in-focus area.

When an image is output through an output apparatus such as a printer described here, the sharpness of the image degrades owing to, for example, degradation of the sharpness of the image by a print medium or ink bleeding, or resolution conversion processing of resizing input image data into a print medium size (print size). The sharpness of an output image similarly degrades even on a display or a projector.

Sharpness in an input image depending on output characteristic in an output apparatus greatly changes in an acceptable in-focus area where sharpness as input data is high (in-focus), and hardly changes in a non-acceptable in-focus area where sharpness as input data is low (out-of-focus). Thus, a degree of change of sharpness differs in each area. More specifically, characteristic of sharpness degradation for each defocus amount differs from each other. For this reason, the relationship between the sharpness in the acceptable in-focus area and that in non-acceptable in-focus area, which influence the three-dimensional appearance of the input image, is not maintained in the output image.

Figure 7A:
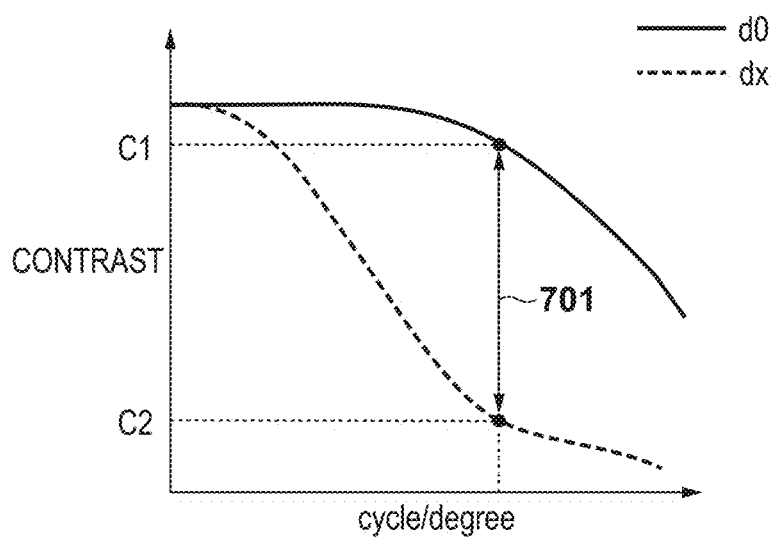
FIGS. 7A, 7B, and 7C are graphs showing the relationship in contrast at a specific frequency between the in-focus area and out-of-focus area of an image at a specific defocus amount.
Figure 7B:
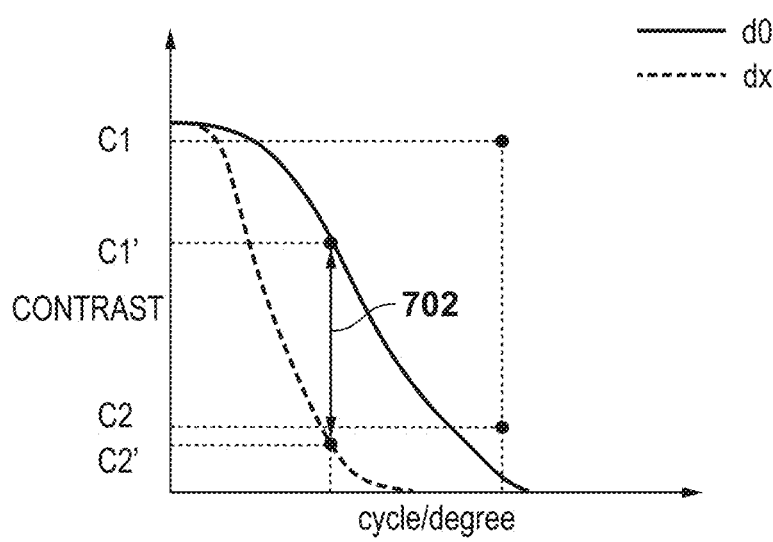
Figure 7C:
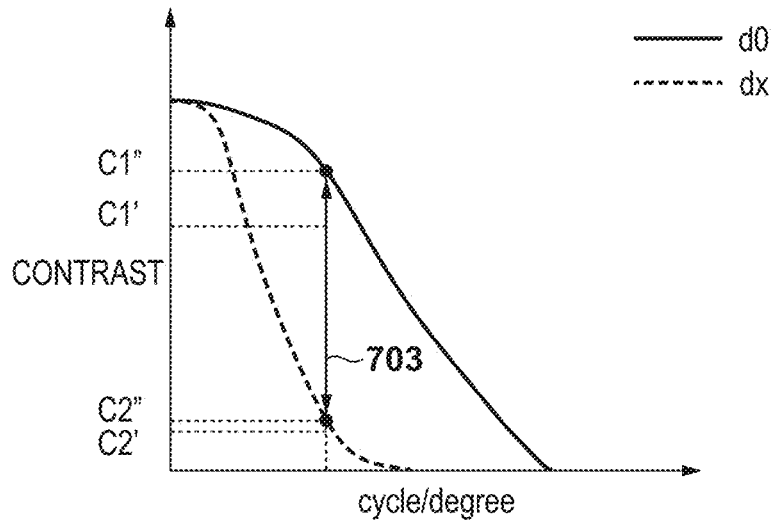

FIGS. 7A to 7C are graphs showing the relationship between the contrast and the spatial frequency (cycle/degree). In FIGS. 7A to 7C, a solid line d0 represents a contrast at a defocus amount of 0, that is, in the in-focus area, and a dotted line dx represents a contrast at the defocus amount dx, that is, in the non-acceptable in-focus area.

In FIGS. 7A to 7C, for descriptive convenience, an image is treated as an image in which the spatial frequency characteristic of the image in the in-focus area and the spatial frequency characteristic of the image corresponding to a specific defocus amount included in the out-of-focus area have a peak at the same frequency. In this case, a characteristic obtained when an input image undergoes enlargement processing to resize it into a print medium size and then is output to the printer is set as an output characteristic. Although the relationship in sharpness between the acceptable in-focus area and the non-acceptable in-focus area is explained by exemplifying enlargement processing as resolution conversion processing, the resolution conversion processing can be same size processing or reduction processing. The output characteristic is sometimes an output characteristic shown in FIGS. 7A to 7C in consideration of the sharpness of an image depending on the print medium and ink blurring.

In an input image that has a three-dimensional appearance due to blurs, a contrast value C1 representing a sharpness of input image data in the in-focus area at a specific spatial frequency and a contrast value C2 representing a sharpness in the out-of-focus area have a relationship shown in FIG. 7A. When this input image is enlarged, the contrast values C1 and C2 change to C1' and C2', as shown in FIG. 7B.

As is apparent from FIGS. 7A and 7B, the change amount of the sharpness of the input image is different between the in-focus area and the out-of-focus area in accordance with the output characteristic of the output apparatus 102. A sharpness difference 702 (a difference between the contrast values C1' and C2') that influences the three-dimensional appearance becomes smaller than a sharpness difference 701 (a difference between the contrast values C1 and C2) in the input image. As a result, the output image cannot obtain a proper three-dimensional appearance. To solve this, the sharpness is properly controlled based on an image blurring state equivalent to the above-described defocus amount and the output characteristic of the output apparatus 102 that influences the sharpness, thereby obtaining an output image with a three-dimensional appearance.

The contrast values of the in-focus area and out-of-focus area have a relationship in FIG. 7C in an output image in which the sharpness of the image is properly controlled using the relationship between the defocus amount and the three-dimensional appearance control amount based on the output characteristic of the output apparatus 102 set in an image output condition to be described later. In FIG. 7C, C1" denotes the contrast value of the in-focus area and C2" denotes the contrast value of the out-of-focus area.

As shown in FIG. 7C, in an output image having undergone three-dimensional appearance control processing based on the image output condition, a sharpness difference 703 (a difference between the contrast values C1" and C2") becomes larger than the sharpness difference 702 (the difference between the contrast values C1' and C2') obtained when no processing is performed.

Since the sharpness difference comes close to the sharpness difference 701 (the difference 701 between the contrast values C1 and C2) in the input image, a proper three-dimensional appearance can be obtained.

In FIGS. 7A to 7C, contrasts at two points of an image that correspond to the spatial frequency of the image in the in-focus area and a specific defocus amount included in the out-of-focus area are compared for descriptive convenience. The above-described relationship is established even for the in-focus area and an image corresponding to another defocus amount in the out-of-focus area. Also, the above-described relationship is established even at two points corresponding to an image corresponding to a specific defocus amount included in the acceptable in-focus area and corresponding to a specific defocus amount included in the non-acceptable in-focus area.

The contrast value has been picked up as an image characteristic that influences the sharpness of an image. As for a change of the sharpness of an image in the in-focus area and the out-of-focus area depending on the output characteristic of the output apparatus 102, it is obvious that the same relationship can be explained even in a spatial frequency characteristic representing the sharpness.

<Three-Dimensional Appearance Control Processing (FIGS. 8A to 9B)>

Three-dimensional appearance control processing performed by the three-dimensional appearance control unit 1005 will be described below.

The three-dimensional appearance control unit 1005 controls the sharpness of input image data using a sharpness control parameter set in the image processing condition holding unit 1006. A three-dimensional appearance control amount corresponding to each defocus amount is set in the image processing condition holding unit 1006.

FIGS. 8A to 8D are graphs showing the relationship between the defocus amount and the three-dimensional appearance control amount that is set in the image processing condition. Note that an image processing condition creation method will be described below.

In step S504, the three-dimensional appearance control unit 1005 obtains the image processing condition set in the image processing condition holding unit 1006. Next, in step S505, the three-dimensional appearance control unit 1005 performs sharpness processing by applying a three-dimensional appearance control amount set in the image processing condition while referring to a defocus amount in the defocus map for a processing target pixel with respect to brightness information of each pixel of input image data. The sharpness processing uses, for example, a Laplacian Of Gaussian filter (equation (6)):

$$h(i,j,\text{def}) = \beta(\text{def})(i^2+j^2-2\sigma^2)/(2\pi\sigma(\text{def})^2) \cdot \exp\{-(i^2+j^2)/(2\sigma(\text{def})^2)\} \quad (6)$$

where $\sigma$, $\beta$ are filter parameters with respect to a three-dimensional appearance control amount, and values according to the defocus amount are set to $\sigma$, $\beta$, respectively. $\sigma$, $\beta$ may be set in advance using an LUT, or may be calculated by an equation related to the defocus amount.

Sharpening processing when the Laplacian Of Gaussian filter represented by equation (6) is used is given by equation (7):

$$\text{Out} = I - h * I \quad (7)$$

where I is an input image, Out is an image after sharpening processing, and * is convolution operation.

In FIGS. 8A to 8D, $\beta = \beta 1$ at the defocus amount d=0 represents a control amount for the in-focus area of an input image. A defocus amount d1 is a value at the boundary between the acceptable in-focus area and the non-acceptable in-focus area shown in FIG. 4. A defocus amount d2 is a maximum defocus amount included in the defocus map.

To obtain a proper three-dimensional appearance considering the output characteristic of the output apparatus 102 in an output image, an image processing condition is set to maximize the three-dimensional appearance control amount for the pixels of the in-focus area in an input image, as shown in FIGS. 8A to 8C. It is desirable to set a three-dimensional appearance control amount in the out-of-focus area so that the control amount becomes smaller as the defocus amount becomes larger, that is, the control amount monotonously decreases.

When a defocus amount equivalent to a distance from the focal plane is a value corresponding to the blurring amount of an image, the defocus amount and the three-dimensional appearance control amount have a nonlinear relationship, as shown in FIG. 8A. When the defocus amount corresponds to an image shift amount, the defocus amount and the three-dimensional appearance control amount have a linear relationship, as shown in FIG. 8B.

Even if the three-dimensional appearance control amount is set to be 0 for the non-acceptable in-focus area, as shown in FIG. 8C, the sharpness difference between the acceptable in-focus area and the non-acceptable in-focus area comes close to the sharpness difference between the acceptable in-focus area and the non-acceptable in-focus area in the input image, and the three-dimensional appearance of the output image can be obtained.

The control amount differs depending on the characteristic of a print medium, that of ink, and the print medium size. This is because the degree of degradation of the sharpness of an image by ink bleeding or the like changes for each print medium or each ink characteristic, and the resizing ratio of resolution conversion processing changes depending on the print medium size.

Figure 9A:
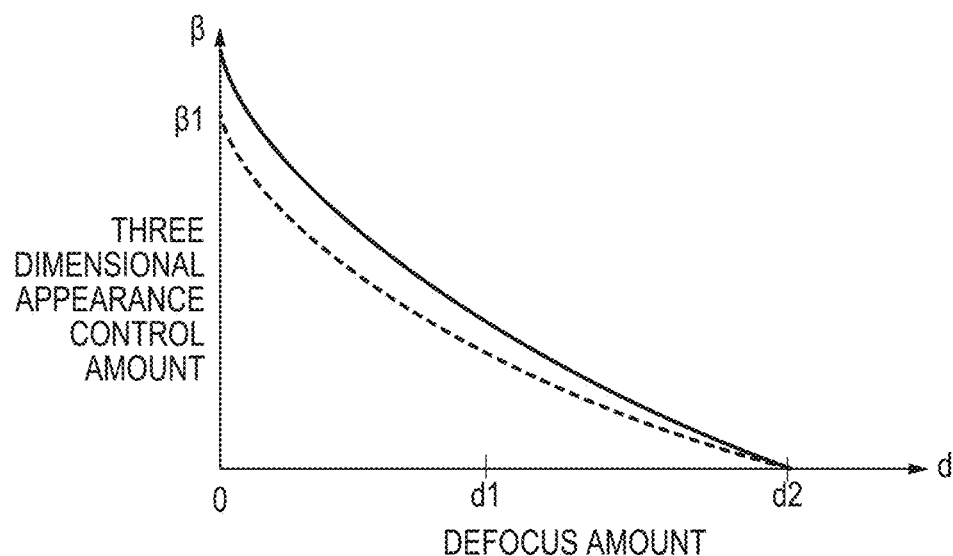
FIGS. 9A and 9B are graphs showing the relationship between the defocus amount and the three-dimensional appearance control amount when a print medium or a print medium size is different.
Figure 9B:
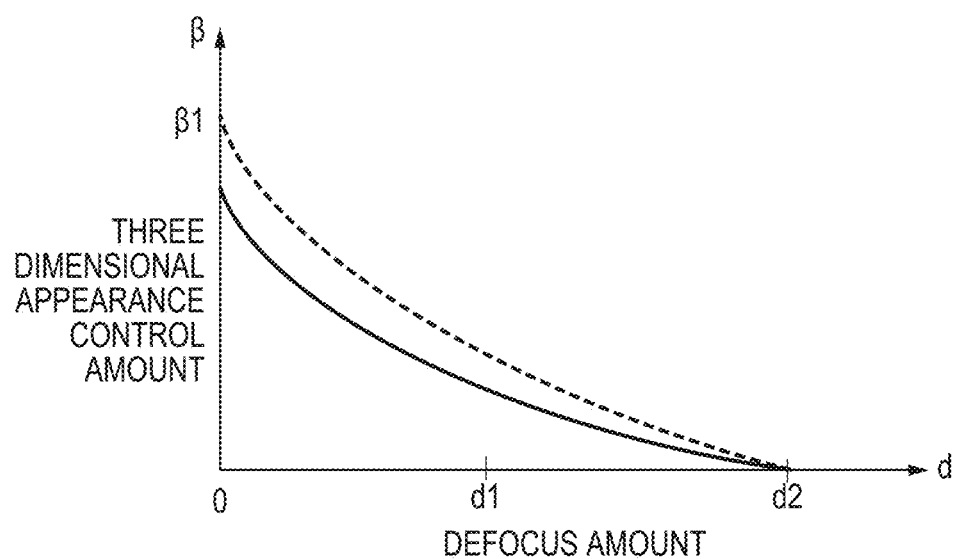

FIGS. 9A and 9B are graphs showing the difference of the three-dimensional appearance control amount depending on the characteristic of a print medium, that of ink, and the print medium size. In FIGS. 9A and 9B, a broken line represents the same output characteristic as that shown in FIG. 8A.

In FIG. 9A, a solid line represents a three-dimensional appearance control amount with respect to a defocus amount when an image is output under a condition different from that in FIG. 8A. The output characteristic shown in FIG. 9A represents a case in which the three-dimensional appearance control amount is large because, for example, ink bleeding is larger than that in FIG. 8A or the resizing ratio is higher. To the contrary, the output characteristic shown in FIG. 9B represents a case in which the three-dimensional appearance control amount is small because ink bleeding is smaller than that in FIG. 8A or the resizing ratio is lower.

Note that the filter used in sharpness processing is not limited to the Laplacian Of Gaussian filter. For example, a filter (specific filter) created by obtaining the inverse characteristic of degradation information of the sharpness of the output apparatus may be used to perform sharpness processing, and adjust and control the sharpness.

Sharpness processing has been exemplified as processing of controlling the sharpness in the above description, but this processing may be contrast processing. More specifically, brightness conversion is performed to increase the contrast of the brightness value of each pixel of input image data in the acceptable in-focus area including the in-focus area, as shown in FIG. 8D. As for the brightness conversion, there are a method using a transformation in which the three-dimensional appearance control amount is a coefficient, and a method of increasing the contrast by equalizing a histogram generated from the brightness value of each pixel of input image data. However, the brightness conversion is not limited to them as long as the contrast can be controlled.

Since sharpness processing and contrast processing can control the sharpness of an output image, either processing may be selected in accordance with the characteristic of the output apparatus or both of them may be used in combination.

<Image Processing Condition (FIGS. 10 to 12)>

A creation method of an image processing condition set in the image processing condition holding unit 1006 will be described here.

Figure 10:
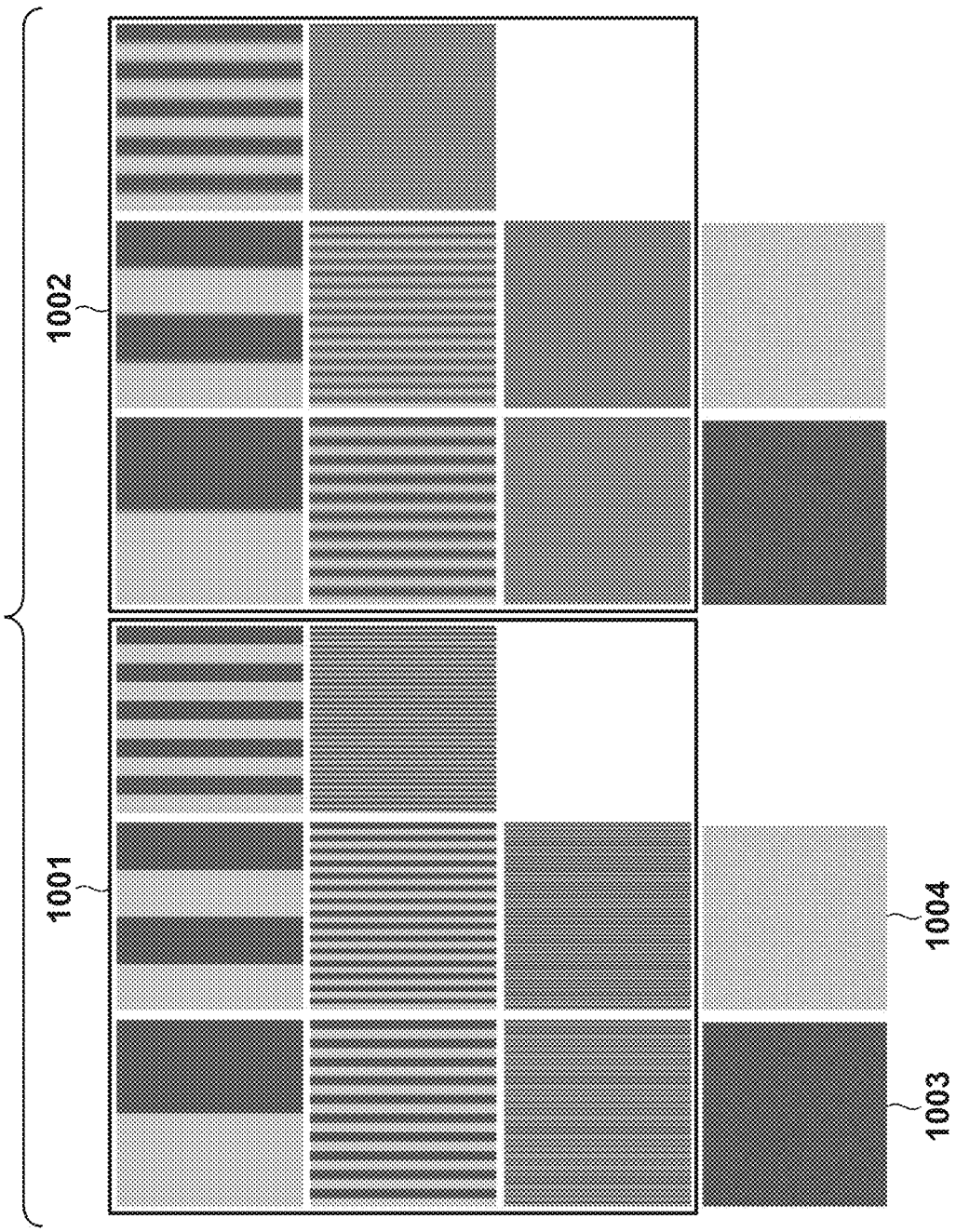
FIG. 10 is a view showing an image for measurement for calculating the frequency characteristic (MTF characteristic) of an output image.

FIG. 10 is a view showing an example of an image for measurement.

For example, an image for measurement as shown in FIG. 10 is output from an output apparatus such as a printer, a display, or a projector. Then, a parameter to be set as an image processing condition is calculated from the frequency characteristic (MTF characteristic) of the output image from the output apparatus that is obtained using a measurement apparatus (not shown). Instead of actually measuring the output image using the measurement apparatus, the MTF characteristic of the output apparatus may be calculated from an image obtained by simulating, on the PC, each image processing when generating the output image.

A sample image shown in FIG. 10 includes a group 1001 of images corresponding to the in-focus focal plane and a group 1002 of images expressed by a blur equivalent to the blurring amount of an input image at a given defocus amount. More specifically, the sample image is a chart including a plurality of rectangular patterns or sinusoidal patterns of different frequencies, and uniform patterns 1003 and 1004.

In the example shown in FIG. 10, the image groups 1001 and 1002 are formed from a plurality of sinusoidal patterns of different frequencies. The uniform patterns 1003 and 1004 are formed from maximum and minimum pixel values on the sinusoidal pattern, respectively.

Figure 11:
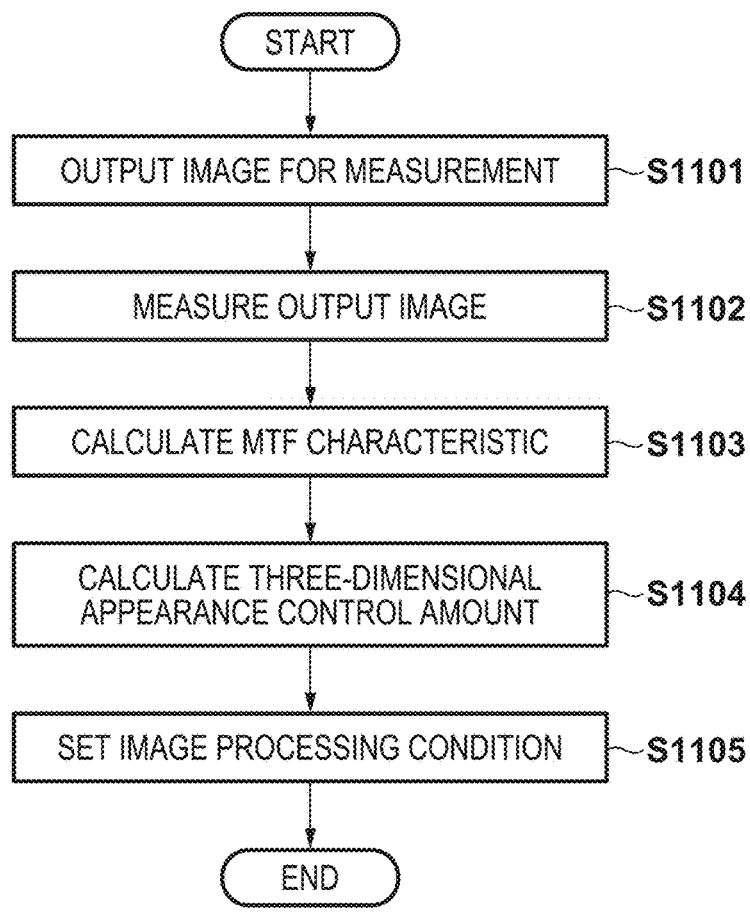
FIG. 11 is a flowchart showing image processing condition creation processing.

FIG. 11 is a flowchart showing an image processing condition creation method.

First, in step S1101, the image for measurement shown in FIG. 10 is output from the output apparatus 102. Then, in step S1102, the image for measurement output from the output apparatus 102 is measured using the measurement apparatus to obtain information necessary to calculate the MTF characteristic.

In a case where the image for measurement is formed from sinusoidal patterns of different frequencies as shown in FIG. 10, the MTF characteristic is calculated using equation (8) or equation (9) in step S1103. This value means the absolute value of an optical transfer function. If the average luminosity of the output image changes, equation (9) is used preferably. Equation (8) and equation (9) are:

$$\text{MTF}(u) = \{C(u)\}/C' \quad (8)$$

u: frequency of a sine wave $$C(u) = \{\text{Max}(u) - \text{Min}(u)\}/\{\text{Max}(u) + \text{Min}(u)\}$$

$$C' = \{(R1-R2)\}/\{(R1+R2)\}$$

Max(u): maximum reflectance of a sinusoidal pattern that changes depending on the frequency
Min(u): minimum reflectance of a sinusoidal pattern that changes depending on the frequency
R1, R2: reflectances of a uniform pattern (R1>R2)

$$\text{MTF}(u) = \{\text{Max}(u) - \text{Min}(u)\}/\{R1-R2\} \quad (9)$$

Note that the R1 and R2 values in equation (8) and equation (9) are reflectances, but the brightness, density, or device RGB value may be used, as a matter of course. The measurement apparatus can be, for example, a scanner, a digital camera, or a microscope if the output apparatus is a printer, and can be a digital camera if the output apparatus is a display or a projector.

In a case where the image for measurement is a rectangular wave pattern, the MTF characteristic of the output apparatus is expressed by a contrast transfer function (CTF) obtained by applying equation (8) or equation (9). Alternatively, an MTF value converted from a CTF value using the Coltman correction equation may be used.

By the above-described method, the frequency characteristics (MTF characteristics) of each image in the image group 1001 corresponding to the focal plane included in the image for measurement and the image group 1002 corresponding to any desired defocus amount are obtained.

Figure 12:
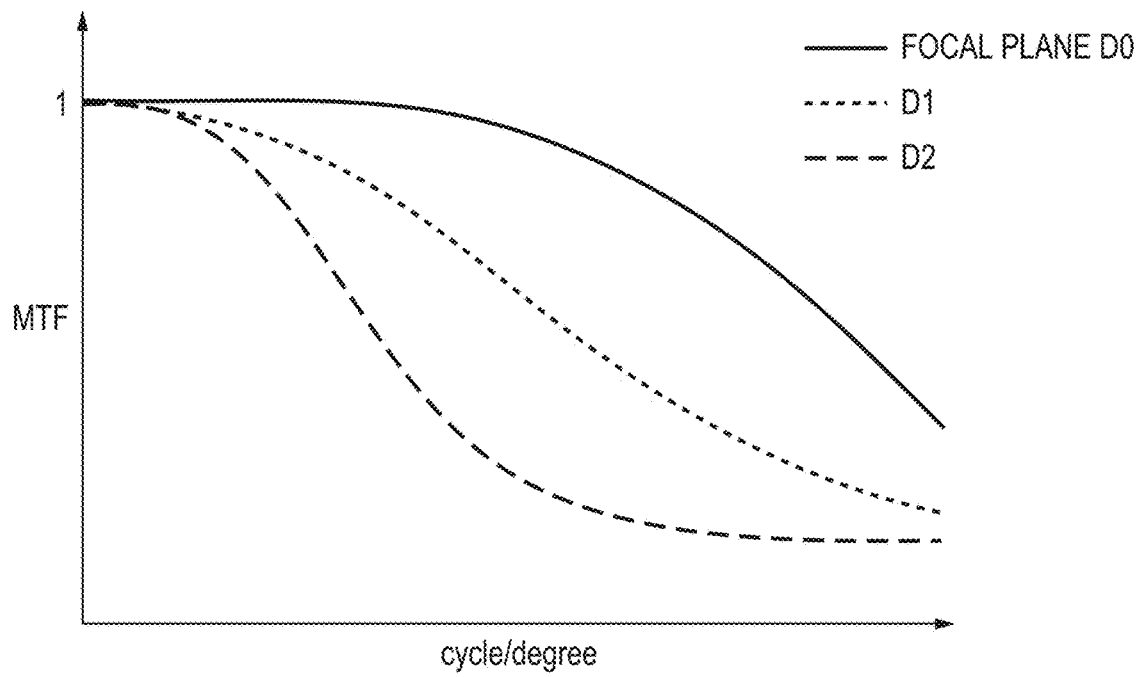
FIG. 12 is a graph exemplifying the frequency characteristics (MTF characteristics) of pixel groups corresponding to the focal plane and an arbitrary defocus amount.

FIG. 12 is a graph showing an example of the frequency characteristic.

In FIG. 12, a solid line D0 represents the characteristic of the image group 1001 corresponding to the focal plane, a dotted line D1 represents the characteristic of an image group corresponding to a defocus amount included in the acceptable in-focus area, and a broken line D2 represents the characteristic of an image group corresponding to a defocus amount included in the non-acceptable in-focus area.

An MTF characteristic can therefore be obtained for each defocus amount. That is, the output characteristic of the output apparatus regarding the sharpness for each defocus amount is obtained.

To obtain a proper three-dimensional appearance in an output image, the sharpness difference between the acceptable in-focus area and the non-acceptable in-focus area in the output image needs to come close to the sharpness difference between the acceptable in-focus area and the non-acceptable in-focus area in an input image in the case of applying three-dimensional appearance control processing, compared to the case of not applying this processing. In other words, to properly control the sharpness difference between the acceptable in-focus area and the non-acceptable in-focus area in an output image, the three-dimensional appearance control amount needs to be set in accordance with the output characteristic of the output apparatus that influences the sharpness for each defocus amount.

More specifically, in step S1104, the three-dimensional appearance control amount is set so that the sharpness or frequency characteristic of the in-focus area of the output image at a specific frequency is restored by sharpening processing to the sharpness or frequency characteristic of the input image. Similarly, as for the out-of-focus area, the restoration amount is calculated from an MTF characteristic obtained for each defocus amount and is used as a three-dimensional appearance control amount. In this manner, the three-dimensional appearance control amount is calculated for the defocus amount shown in FIGS. 8A to 8D.

For example, the relationship between the defocus amount and the sharpness is set as a relation that receives a defocus amount and outputs a three-dimensional appearance control amount, as shown in FIGS. 8A to 8D, or is set by selecting a parameter according to the LUT method.

Needless to say, the method of setting the relationship is not limited to them and any method is acceptable as long as the three-dimensional appearance control amount can be calculated for the defocus amount.

The three-dimensional appearance control amount is not limited to a value for restoring the MTF characteristic. A proper three-dimensional appearance is obtained in an output image if it is satisfied that the sharpness difference when performing sharpening processing in accordance with a defocus amount and sharpening control amount based on the output characteristic of the output apparatus 102 set in the image processing condition becomes larger than the sharpness difference when not performing the processing. When the control amount β1 of the focal plane shown in FIGS. 8A to 8D is set to restore the MTF characteristic of an image from 0.8 to 1.2, an image with desirable sharpness on the focal plane in an output image is obtained.

Finally, in step S1105, an image processing condition derived from an output characteristic regarding the sharpness of the output apparatus 102 corresponding to the defocus amount is set, as described above. The three-dimensional appearance of an output image can be controlled by processing input image data in accordance with the set image processing condition.

According to the above-described embodiment, information equivalent to a distance from the focal plane, in which the correspondence with edited image data is recovered, can be generated by regenerating a defocus map using the score of the defocus map obtained from an input image. Therefore, the original sense of depth and the three-dimensional appearance can be recovered in an output image.

Note that information equivalent to a distance from the focal plane, which is generated according to this embodiment, is applicable not only to the three-dimensional appearance control but also to other processes as described below.

[Object Recognition]

Information equivalent to a distance from the focal plane, which is generated according to this embodiment, is used for recognition of an object in an image. An example of performing recognition using the depth of object is described in detail in Japanese Patent Laid-Open No. 2014-179097 and the like. The precision of object recognition even in edited image data is improved by using, for object recognition, information equivalent to a distance from the focal plane, which is generated according to this embodiment.

[Generation of Three-Dimensional Polygon Model]

Information from the focal plane, which is generated according to this embodiment, is used for generation of a three-dimensional polygon model. An example of generating a three-dimensional polygon model using the depth is described in detail in Japanese Patent Laid-Open No. 2017-157208 and the like. The precision of a three-dimensional polygon model corresponding to edited image data is improved by using information equivalent to a distance from the focal plane, which is generated according to this embodiment.

[Object Extraction]

Information equivalent to a distance from the focal plane, which is generated according to this embodiment, is used for object extraction. An example of extracting an object from an image using the depth is described in detail in Japanese Patent Laid-Open No. 2015-162730 and the like. The precision of object extraction from edited image data is improved by using, for object recognition, information equivalent to a distance from the focal plane, which is generated according to this embodiment.

[Effect Processing]

Information equivalent to a distance from the focal plane, which is generated according to this embodiment, is used for effect processing on an image. An example of giving an effect to an image using the depth is described in detail in Japanese Patent Laid-Open No. 2013-118468 and the like. An artifact such as a pseudo-outline at the time of effect processing, which is generated owing to inaccuracy of depth information with respect to edited image data, can be reduced by using, for object recognition, information equivalent to a distance from the focal plane, which is generated according to this embodiment.

Examples to which the present invention is applicable are not limited to the above-described ones. The present invention is applicable to any example as long as information equivalent to a distance from the focal plane is used.

In the above-described embodiment, the relationship between the defocus amount and the three-dimensional appearance control amount is exemplified as the image processing condition. However, the relationship between the three-dimensional appearance control amount and, the image shift amount, which is information equivalent to a distance from the focal plane, or the distance between the focal plane and the object may be adopted as the image processing condition.

In the above-described embodiment, data edited from data obtained by shooting by an image-capturing apparatus such as a camera is used as image data of a photographic image, and a defocus amount at the time of shooting is used as information equivalent to a distance from the focal plane. However, the present invention is not limited to them. Data edited from data of a photographic image created by modeling, rendering, image editing software, or the like, and information equivalent to a distance from the focal plane that is created by software corresponding to the image data can also be used. These software programs sometimes generate blur information of an image or the like using a map serving as information equivalent to a distance from the focal plane.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-128568, filed Jul. 5, 2018, which is hereby incorporated by reference herein in its entirety.

What is claimed is:

1. An image processing apparatus comprising:
an acquiring unit configured to acquire edited image data obtained by editing image data so as to change sharpness of an image after the image data is created;
an obtaining unit configured to obtain information indicating a distance between an area in an image represented by the image data before editing and a focal plane, the information being created before editing the image data; and
a generation unit configured to generate information indicating an adjusted distance between an area in an image represented by the edited image data and a focal plane corresponding to a sharpness of an image represented by the edited image data, based on (a) the edited image data acquired by the acquiring unit and (b) the information obtained by the obtaining unit.

2. The apparatus according to claim 1, further comprising:
a setting unit configured to set an image processing condition for executing image processing, based on an output characteristic that influences sharpness of an image output from an output apparatus; and
an image processing unit configured to perform image processing on the edited image data by using (a) the information indicating the adjusted distance between the area in an image represented by the edited image data and the focal plane, generated by the generation unit, and (b) the image processing condition set by the setting unit.

3. The apparatus according to claim 2, wherein one of (a) a defocus amount corresponding to each pixel of the image data, (b) a distance from the focal plane to the object, and (c) a parallax amount is used as the information indicating the adjusted distance between an area in an image represented by the edited image data and the focal plane.

4. The apparatus according to claim 3, wherein the image processing condition includes a three-dimensional appearance control amount with respect to the information indicating the adjusted distance between an area in an image represented by the edited image data and the focal plane, and
wherein the image processing unit includes three-dimensional appearance control processing.

5. The apparatus according to claim 4, wherein the image processing unit executes image processing of controlling sharpness representing a three-dimensional appearance of an image to monotonically decrease as the information indicating the adjusted distance between an area in an image represented by the edited image data and the focal plane increases.

6. The apparatus according to claim 5, wherein the image processing unit performs, as the image processing of controlling the sharpness, brightness conversion to increase a contrast of a brightness value represented by the image data in an acceptable in-focus area including an in-focus area in image-shooting the object.

7. The apparatus according to claim 3, wherein the generation unit includes:
a dividing unit configured to divide an image represented by the edited image data into a plurality of areas based on the edited image data; and
a calculating unit configured to calculate, for each of the plurality of areas divided by the dividing unit, information indicating a distance between an area in an image divided by the dividing unit and a focal plane of the area.

8. The apparatus according to claim 7, wherein the calculating unit calculates, as the information indicating the distance between an area in an image divided by the dividing unit and the focal plane of the area, a median of pieces of information indicating distances between an area in an image divided by the dividing unit and focal planes of respective pixels included in the area.

9. The apparatus according to claim 8, wherein the obtaining unit obtains reliability information representing reliability of the information indicating the distance between an area in an image divided by the dividing unit and the focal plane, and
wherein the calculating unit determines, based on the reliability information, whether the information indicating the distance between an area in an image divided by the dividing unit and the focal plane of the area is reliable.

10. The apparatus according to claim 1, wherein the image processing apparatus is included in a personal computer or an output apparatus.

11. The apparatus according to claim 2, wherein the output apparatus is an inkjet printer configured to discharge ink to a print medium and print an image.

12. The apparatus according to claim 1, wherein the image data is created by image-capturing an object by a capturing device.

13. A non-transitory computer-readable storage medium which stores a computer program to be executed in a processor of an image processing apparatus for acquiring edited image data obtained by editing image data so as to change sharpness of an image after the image data is created, the program comprising:
obtaining information indicating a distance between an area in an image represented by the image data before editing and a focal plane, the information being created before editing the image data; and
generating information indicating an adjusted distance between an area in an image represented by the edited image data and a focal plane corresponding to a sharpness of an image represented by the edited image data, based on (a) the acquired edited image data and (b) the obtained information.

14. An image processing method comprising:
acquiring edited image data obtained by editing image data so as to change sharpness of an image after the image data is created;
obtaining information indicating a distance between an area in an image represented by the image data before editing and a focal plane, the information being created before editing the image data; and
generating information indicating an adjusted distance between an area in an image represented by the edited image data and a focal plane corresponding to a sharpness of an image represented by the edited image data, based on (a) the acquired edited image data and (b) the obtained information.

15. The method according to claim 14, further comprising:
setting an image processing condition for executing image processing, based on an output characteristic that influences sharpness of an image output from an output apparatus; and performing image processing on the edited image data by using (a) the generated information indicating the adjusted distance between the area in an image represented by the edited image data and the focal plane and (b) the set image processing condition.

16. The method according to claim 15, wherein one of (a) a defocus amount corresponding to each pixel of the image data, (b) a distance from the focal plane to the object, and (c) a parallax amount is used as the information indicating the adjusted distance between the area in an image represented by the edited image data and the focal plane.

17. The method according to claim 16, wherein the image processing condition includes a three-dimensional appearance control amount with respect to the information indicating the adjusted distance between the area in an image represented by the edited image data and the focal plane, and
wherein the image processing includes three-dimensional appearance control processing.

18. The method according to claim 17, wherein the image processing executes image processing of controlling sharpness representing a three-dimensional appearance of an image to monotonically decrease as the information indicating the adjusted distance between the area in an image represented by the edited image data and the focal plane increases.

19. The method according to claim 18, wherein the image processing performs, as the image processing of controlling the sharpness, brightness conversion to increase a contrast of a brightness value represented by the image data in an acceptable in-focus area including an in-focus area in image-shooting the object.

20. The method according to claim 16, wherein the generating includes (a) dividing an image represented by the edited image data into a plurality of areas based on the edited image data, and (b) calculating, for each of the plurality of divided areas, information indicating a distance between the area in the divided image and a focal plane of the area.

21. The method according to claim 20, wherein in the calculating, a median of pieces of information indicating distances between an area in the divided image and focal planes of respective pixels included in the area is calculated as the information indicating the distance between the area in the divided image and the focal plane of the area.

22. The method according to claim 14, further comprising creating the image data by image-capturing an object by a capturing device.

* * * * *